United States Patent [19]

Matsumoto et al.

[11] 4,256,492
[45] Mar. 17, 1981

[54] MARKER INK FOR WRITING BOARD

[75] Inventors: Kenji Matsumoto, Kokubunji; Shintaro Hishikawa; Yoshikatsu Ito, both of Urawa, all of Japan

[73] Assignees: Taihei Chemicals Ltd.; Matsumoto Textile & Chemical Consultants Co., both of Tokyo, Japan

[21] Appl. No.: 968,819

[22] Filed: Dec. 12, 1978

[30] Foreign Application Priority Data

May 2, 1978 [JP] Japan .................................. 53-52255
May 23, 1978 [JP] Japan .................................. 53-60599
Nov. 9, 1978 [JP] Japan .................................. 53-137342

[51] Int. Cl.³ ............................................. C09D 11/00
[52] U.S. Cl. ........................................ 106/22; 106/23;
106/26; 106/187; 106/189; 106/197; 260/31.2 R; 260/32.4; 260/32.8 R; 260/33.4 R
[58] Field of Search .................. 106/22, 23, 187, 189, 106/191; 260/31.2 R, 32.4, 32.8 R, 33.4 R

[56] References Cited

U.S. PATENT DOCUMENTS

| 2,343,781 | 3/1944 | Locke | 106/30 |
|---|---|---|---|
| 2,991,184 | 7/1961 | Bernardi et al. | 106/30 |
| 3,280,036 | 10/1966 | Howell | 252/62.1 |
| 3,486,912 | 12/1969 | Dyson | 106/22 |
| 4,042,545 | 8/1977 | Defago et al. | 260/13 |
| 4,070,322 | 1/1978 | Hwang et al. | 260/29.6 R |

FOREIGN PATENT DOCUMENTS 1311154 3/1973 United Kingdom .

*Primary Examiner*—Earl A. Nielsen
*Attorney, Agent, or Firm*—Oblon, Fisher, Spivak, McClelland & Maier

[57] ABSTRACT

A colored marker ink for use on a writing board is manufactured by blending a colorant, a resin and a mixed solvent consisting of a good solvent for the resin possessing a high speed of vaporization and a non-solvent for the resin possessing a lower speed of vaporization than that of the good solvent. When a letter or figure is written on the board with this marker ink, the resin component of the ink thus applied to the board gels into opaque lines in the shape of the letter or figure in consequence of gradual vaporization of the good solvent.

11 Claims, No Drawings

MARKER INK FOR WRITING BOARD

BACKGROUND OF THE INVENTION

This invention relates to a colored marker ink to be used on a writing board of black or a dark color for the purpose of producing thereon opaque marker traces.

The marker inks available today on the market are chiefly of the type intended for use on white writing boards. These marker inks for use on white writing boards produce transparent marker traces when applied to the boards. When such a marker ink is used on a writing board which happens to be black or of a dark color, the surface of the writing board shows through the marker traces deposited on the board because of the transparency of the ink, with the result that the letters or figures written with the ink are obscured by the color of the underlying writing board possibly to the extent of being illegible. Thus, these conventional marker inks cannot be effectively used for the purpose of writing letters or figures on surfaces which are black or of dark colors.

One of the conventional types of marker inks formulated to produce opaque letters or figures on writing surfaces is known to resort to dispersion of a pigment in the ink composition. This particular type of marker ink produces opaque marker traces on a writing surface owing to the dispersion of pigment particles throughout the ink composition. When such an opaque marker is used in writing letters on a writing surface, the pigment particles dispersed in the ink composition settle directly onto the finely rugged contour of the writing surface and form the marker traces. When the letters thus written are erased by wiping, those pigment particles settling in the finely rugged contour of the writing surface cannot readily be wiped out so that perfect erasure of the marker traces is impossible.

A quick-drying writing ink has already been proposed (U.S. Pat. No. 3,486,912). This quick-drying ink is directed solely to ensuring the rapidity with which the ink applied to the writing paper dries. It is not intended to form on the writing board opaque traces which can be readily erased.

An electrostatic printing ink has also been proposed (U.S. Pat. No. 3,280,036). This is an ink obtained by dispersing a dye in water and is not a solvent-type ink.

There has further been proposed a fiber-pen ink which comprises a resin, a good solvent for the resin having a high speed of vaporization and a non-solvent for the resin having a lower speed of vaporization than the good solvent mentioned above (British Pat. No. 1,311,154). This ink is intended primarily to prevent the nib of the pen from drying up while the pen is not in use.

An object of the present invention is to provide a marker ink which forms clear colored marker traces on a writing board, particularly a writing board which is black or of a dark color.

Another object of this invention is to provide a marker ink which forms on the writing board marker traces capable of being readily wiped off the board surface.

SUMMARY OF THE INVENTION

To accomplish the objects described above according to the present invention, there is provided a marker ink which is obtained by blending a colorant, a resin and a mixed solvent consisting of a good solvent for the resin possessing a high speed of vaporization and a non-solvent for the resin possessing a lower speed of vaporization than the good solvent. The marker ink composition thus produced is capable of forming clear colored marker traces on the writing board, particularly if the writing board is black or of a dark color. When letters or figures are written on the writing board by use of the marker ink of the foregoing composition, since the good solvent for the resin vaporizes at a higher speed than the non-solvent, the proportion of the non-solvent in the mixed solvent increases and the resin in the mixed solvent is gradually gelled and deposited in the form of opaque marker traces on the writing board, with the colorant adsorbed on the deposited resin. Consequently, clear colored marker traces are formed on the writing board.

When the marker ink is composed of a resin and a mixed solvent consisting of a good solvent for the resin possessing a high speed of vaporization and a non-solvent possessing a lower speed of vaporization than the good solvent, it forms on the writing board marker traces which are readily wiped off the board surface.

The marker traces which are formed on the surface of the writing board are very easily wiped off because these traces are composed chiefly of a film of gelled resin.

When the marker ink is composed of a pigment as a colorant, a resin and a mixed solvent consisting of a good solvent for the resin possessing a high speed of vaporization and a non-solvent for the resin possessing a lower speed of vaporization than the good solvent, it forms on the surface of the writing board marker traces which readily collapse into fine particles upon contact with the eraser and, therefore, permit very easy erasure.

In consequence of the vaporization of the good solvent, the resin is gradually gelled and settles to the surface of the writing board, with the colorant adsorbed on the resin, giving rise to colored marker traces on the board. The marker traces are readily wiped off the surface of the writing board and are easily reduced into a fine powder which can be easily disposed of.

DESCRIPTION OF PREFERRED EMBODIMENT

For the purpose of the present invention, the resin to be used in the marker ink composition is required to possess high affinity for the colorant and undergo ready loss of transparency. Further, the resin is desired to possess no appreciably high degree of polymerization. Typical examples of resins which are usable for the present purpose include cellulose-derivative resins such as nitrocellulose, cellulose acetate, ethyl cellulose and cellulose acetate butyrate and vinyl chloride-vinyl acetate copolymers. As the colorant, both dyestuffs and pigments can be used. The effects of marker inks are not the same when a dyestuff is used as the colorant and when a pigment is used as such.

To be specific, when a dyestuff is used as the colorant, since the dyestuff is dissolved and dispersed in the ink composition, the marker ink finally produced will not cause clogging even when the marker is a fiber pen. On the other hand, this marker ink has a disadvantage that the dyestuff is not thoroughly adsorbed on the opacified resin film deposited on the surface of the writing board and the dyestuff, consequently, collects and smears the edges of marker traces.

The dyestuff to be used in the marker ink composition of this invention is desired to possess affinity for the aforementioned resin. Examples of dyestuffs which are preferably used include water-insoluble basic dyes, spirit dyes and oil dyes such as Victoria blue-B, Rhodamine B base, Polyester blue-T-S (product of Nippon Chemical Co., Ltd.) and Oplas blue (product of Oriental Dye Co., Ltd.). In the case of a white marker ink, use of a white dye or fluorescent dye greatly enhances the whiteness derivable from the loss of transparency of the resin. Such a dye is desired to be used in the ink composition in an amount necessary and sufficient for the purpose of being adsorbed on the surface of the resin gelled and deposited on the surface of the writing board. If the amount of the dye is insufficient, the marker ink cannot easily form clear colored marker traces. If the amount is too large, the excess dye is not adsorbed on the surface of the deposited resin and as a result undesirable smearing the surface of the writing board may occur.

Another method available for causing the adsorption of the dye on the resin film is by allowing the dye to be combined in advance with the resin in the state of fast dyeing. Since in the state of fast dyeing mentioned above, the dye is physically and chemically sorbed fast on the resin and will not easily be separated from the resin. The dye thus sorbed fast on the resin, unlike the dye which is merely mixed physically with the resin, remains in the sorbed state on the resin even in the ink composition. Consequently, the dye will not come off the resin film deposited on the surface of the writing board.

The dye to be used for this purpose is required to possess high affinity for the resin on which it is to be sorbed fast. Examples of dyes which are advantageously used for this purpose include disperse dyes and reactive dyes which are used generally for dyeing cellulose acetate and synthetic fibers. Particularly dyes for cellulose acetate prove useful for fast dyeing on other cellulose-derivative resins.

The fast dyeing of the resin with the dye is accomplished, for example, by first dissolving the dye in the solvent and subsequently adding the resin to the resultant solution. If the solvent happens to be a good solvent for the resin, the fast dyeing proceeds in the form of solution dyeing. If the solvent happens to be a swelling agent for the resin, then the fast dyeing proceeds in the form of impregnation dyeing. If the solvent happens to be a non-solvent for the resin, the fast dyeing is effected at an elevated temperature.

When a pigment is used as the colorant, the particles of the pigment are not dissolved but are simply dispersed in the ink's solvent, the resin which is gradually gelled in consequence of the vaporization of the good solvent is adsorbed and deposited on the particles of the pigment, giving rise to marker traces on the surface of the writing board. Thus, the marker traces can be easily wiped off by erasure and are reduced into a fine powder which is not bulky and can very easily be disposed of.

On the other hand, since the particles of the pigment dispersed in the ink's solvent are separated from the resin and sedimented independently of the resin, the produced marker traces are often devoid of clear color. Besides, the particles of the pigment thus sedimented independently of the resin may possibly smear the surface of the writing board.

The present invention, therefore, contemplates causing the pigment to be thoroughly incorporated by kneading into the resin with a view to heightening the coloring force of the pigment and preventing the pigment from being separated from the resin.

Although the pigment to be used in the ink composition of the present invention may be of an inorganic type or an organic type, whichever may better suit the occasion, an organic pigment proves to be more desirable than an inorganic pigment in the sense that the pigment contained in the ink composition should offer more resistance to the phenomenon of sedimentation.

Examples of inorganic pigments and organic pigments which are usable for the purpose of this invention include Titanium white A-220 (anatase type) (product of Ishihara Sangyo Kaisha), Carbmine 6B-226 (red) (product of Dai-Nippon Ink Chemical Industries), Cyanin blue-NK (blue) (Dai-Nippon Ink Chemical Industries) and Yellow-HR70 (product of Hoechst Chemical Co., Ltd.).

A typical kneading operation comprises the steps of adding 10 to 300 parts of a pigment to 100 parts of a resin, further adding thereto a small amount of a solvent, kneading these ingredients with rolls and, at the same time, allowing the solvent to vaporize out of the mixture.

Another typical kneading operation comprises the steps of adding a resin and a pigment to a mixed solvent consisting of a good solvent for the resin possessing a high speed of vaporization and a non-solvent for the resin possessing a lower speed of vaporization than the good solvent, and kneading these ingredients in a closed dispersing machine such as a ball mill or paint shaker. The kneading operation produces a pasty dispersion. Examples of good solvents possessing high speeds of vaporization and used advantageously in the ink composition of the present invention include acetone, methylethyl ketone, methyl acetate, methanol, ethanol, and nitromethane. When the marker is to be a fiber pen, the solvent used in the ink composition is required to possess a low speed of vaporization with a view to preventing the nib from drying up while not in use. Thus, it is necessary to select from a wide range of good solvents the particular solvent which possesses a speed of vaporization appropriate for the use to which the marker ink is put.

When a dye is used as the colorant, it is required to opacify the resin deposited on the surface of the writing board so as to add greatly to the clarity of the marker traces in contract to the color of the writing board. In this case, in order to increase the speed of the resin's opacification, the good solvent to be selected is required to possess a high speed of vaporization. Further for the purpose of enabling the opacification to proceed effectively, the solvent to be used is desired to possess sufficient hydrophilicity. The reason why the good solvent is preferred to be hydrophilic is that the solvent in the ink composition absorbs ambience water and, by virtue of the absorbed water, accelerates the gelation and consequently the opacification of the resin. When the marker ink is to be used in a dry climate, the ink composition may incorporate a small amount of water in advance.

Examples of non-solvents possessing lower speeds of vaporization than the aforementioned good solvents and advantageously used in the ink composition of the present invention include n-butanol, iso-propyl alcohol, toluol, xylol and n-butyl acetate.

Where a dye is used as the colorant in the ink composition of the present invention, to ensure effective opacification of the resin, the non-solvent to be used is required to possess a lower speed of vaporization than the good solvent. Further, the non-solvent is desired to be hydrophobic. The reason why the non-solvent is desired to be hydrophobic is that the solvent cooperates with the water present in the ink composition to accelerate the gelation and consequently the opacification of the resin.

When a pigment is used as the colorant in the ink composition, since the pigment is generally more opaque than the dye, the ink composition permits marker traces deposited on a writing board which is black or of a dark color to stand out with sufficient clarity on the surface of the writing board without necessarily requiring the resin to be opacified. For this reason, therefore, there is no need for selecting a good solvent possessing high hydrophilicity and a non-solvent possessing high hydrophobicity. Neither is there any need for selecting a good solvent possessing a particularly high speed of vaporization so as to enhance the speed of the resin's opacification. When the pigment is used as the colorant in the ink composition, therefore, it is permissible to select a solvent which possesses as low a speed of vaporization as possible for the purpose of preventing the nib of the marker from drying up while not in use. When the pigment is used as the colorant, however, the solvent to be used is required to have viscosity high enough to prevent the pigment from settling in the ink composition.

The solvent system for the ink of the present invention is a mixture consisting of a good solvent and a non-solvent of the types described above. The ink is produced by adding the colorant and the resin to this mixed solvent.

When the ink prepared as described above is used in writing letters on a writing board, the proportion of the non-solvent in the solvent system gradually increases as the good solvent evaporates from the marker traces deposited on the surface of the writing board, with the result that the resin dissolved in the solvent system is gelled in its opacified state. Since the colorant is adsorbed or dyed fast on the resin in its opacified state, the resin permits the marker traces to stand out with high clarity on the surface of the writing board.

According to the present invention, therefore, there is provided a marker ink which is capable of forming on a writing board which is black or of a dark color, clear colored marker traces. The resin component in these marker traces forms a microporous film upon gelation. Owing to the microporous structure of the resin of which the marker traces are formed, the marker traces can easily be wiped off with paper or cloth.

When the pigment is used as the colorant, since the pigment itself is opaque, the marker ink is capable of forming amply clear marker traces without any particular need of opacifying the resin. These marker traces are formed by the phenomenon that the gelled resin is adsorbed on the particles of pigment and sedimented in the adsorbed state. Thus, the marker traces are easily wiped off and converted into a fine powder with great ease. And, this powdery waste is of extremely small volume compared with a filmy waste of erasure and, therefore, is both easy to dispose and does not seriously smear the writing board.

In the present invention, in place of one good solvent and one non-solvent, a suitable combination of two or more good solvents and two or more non-solvents may be selected to satisfy the purpose for which the marker ink is used. Similarly, two or more dyes or pigments may be selected in a combination suitable for the purpose of use. As occasion demands, a dye and a pigment may be used in combination.

Now the present invention will be described with reference to preferred embodiments of the invention. This invention is not limited to these examples.

EXAMPLE 1

In a mixed solvent consisting of 60 g of ethyl acetate and 37 g of n-butanol, 2 g of nitrocellulose of the grade for use in paints was dissolved. Then 1 g of Victoria blue B was dissolved in the resultant solution to produce an ink. When letters were written with a marker using this ink on a blackboard, clear green marker traces appeared on the blackboard and increased in conspicuousness in consequence of the opacification of the resin. These marker traces could easily be erased when they were wiped with paper or cloth.

EXAMPLE 2

In a mixed solvent consisting of 60 g of acetone and 37 g of toluol, 2 g of cellulose acetate of the grade for use in paints was dissolved. Then 1 g of Rhodamine B base was dissolved in the resultant solution to produce an ink. When letters were written with a marker using this ink on a green board, clear red marker traces appeared on the green board and increased in conspicuousness in consequence of the opacification of the resin. These marker traces could easily be erased when they were wiped with paper or cloth.

EXAMPLE 3

Cellulose acetate was dissolved in methyl acetate. In the resultant solution, Reactone Blue RL-F (product by Geigy) as a dye possessing high affinity for the cellulose acetate was dissolved and boiled for 60 minutes at the boiling point of methyl acetate to have the resinous component dyed fast. The resultant blend was cooled and then added with water to cause precipitation of the dyed cellulose acetate. The dyed cellulose acetate was washed and dried.

Then, a solution composed of 60% of acetone, 15% of n-butanol, 15% of isopropyl alcohol and 10% of toluol was prepared. This solution exhibited no solubility to Reactone Blue RL-F. A blue ink was obtained when 4 g of the dyed cellulose acetate was dissolved in 100 g of this solution. When letters were written with a marker using this blue ink on a steel board of white or black, clear blue marker traces appeared on the steel board. These marker traces could easily be erased when they were wiped with dry cloth or paper.

The powdery dust of the ink adhering to the eraser consisted of much larger resin particles than those of the dye initially used and had no possibility of smearing other objects nearby.

EXAMPLE 4

Finely divided nitrocellulose powder was dispersed in methanol having Celanthrene Red Y (Dupont) dissolved in advance therein and the resultant dispersion was heated for 60 minutes at the boiling point of methanol to have the resinous component dyed fast. The dyed component was washed with water and dried to afford colored nitrocellulose. Then a solution composed of 60 g of ethyl acetate, 30 g of n-butanol and 10 g of isopropyl alcohol was prepared. This solution exhibited no solubility to Celanthrene Red Y. In 100 g of this solution, 3 g of the dyed nitrocellulose was dissolved. Consequently, there was obtained a red ink. When letters were written with a marker using this red ink on a steel board of white or black, clear red marker traces appeared on the steel board. These marker traces could easily be erased when they were wiped with dry cloth or paper.

EXAMPLE 5

Ethyl cellulose was dissolved in acetone. Acetamine Rubine B (Dupont) was dissolved in the solution, and the resultant solution was heated for 60 minutes at the boiling point of acetone to have the resinous component dyed fast. The mixture was cooled and added with water to have the dyed ethyl cellulose precipitated. The precipitate was washed and dried. A solution composed of 60 g of ethanol, 10 g of toluol, 15 g of n-butanol, and 15 g of methyl-isobutyl ketone was prepared. This solution exhibited substantially no solubility to Acetamine Rubine B. A reddish purple ink was obtained by dissolving 3 g of the dyed ethyl cellulose in 100 g of the solution. When letters were written with a marker using this ink on a steel board of white or black, clear reddish purple marker traces appeared on the steel board. These marker traces could be easily erased when they were wiped with dry cloth or paper.

EXAMPLE 6

A copolymer formed of 85% of vinyl chloride and 15% of vinyl acetate was dissolved in acetone. In the resultant solution, Celanthrene Pure Blue BRS (Dupont) was dissolved and heated for 60 minutes at the boiling point of acetone to have the resinous component dyed fast. The resultant mixture was cooled and added with water to have the copolymer precipitated. The precipitate was removed, washed and dried. Subsequently, a solution composed of 65 g of methyl acetate and 35 g of n-butanol was prepared.

This solution exhibited substantially no solubility to Celanthrene Pure Blue BRS. A blue ink was obtained by dissolving 3 g of the dyed copolymer in 100 g of the solution.

When letters were written with a marker using this ink on a steel board of white or black, clear blue marker traces appeared on the steel board. These marker traces could easily be erased when they were wiped with dry cloth or paper.

EXAMPLE 7

Cellulose acetates L20 (product by Dicel) was used as the resin. This resin was added to isopropyl alcohol. Then 20% by weight of Yellow HR70 based on the resin was further added. The ingredients were kneaded and simultaneously heated to expel the isopropyl alcohol. Consequently, there was obtained a resin having the pigment thoroughly incorporated therein.

In a mixed solvent consisting of 40 cc of methylethylketone, 10 cc of ethanol and 20 cc of nitromethane, 2 g of the resin incorporating the pigment of 1 g of cellulose acetate were dissolved. Then 15 cc of xylol and 15 cc of n-butyl acetate were further added to produce an ink.

EXAMPLE 8

Cellulose acetate L30 (product by Dicel) was used as the resin. A test pebble mill having an inner volume of 20 liters was charged with 140 g of this resin and 20 g of Cyanin Blue NK (product of Dai-Nippon Ink Chemical) in conjunction with 2800 cc of MEK, 700 cc of ethanol, 1400 cc nitromethane, 1050 cc of xylol and 1050 cc of n-butyl acetate. With the mill tightly closed, the ingredients were treated for 24 hours and then removed. The product was a blue ink which could be used without any further treatment.

When this ink was left to stand at rest for some time, no pigment was found to settle to the bottom. Thus, the ink enjoyed stability. On the writing board, it produced clear marker traces. These marker traces could easily be erased. The dust of erasure was in the form of a powder which could be very easily disposed of.

What is claimed is:

1. A colored marker ink for use on a writing board and capable of forming opaque marker traces on the board, which consists essentially of: a uniformly blended mixture of a colorant, a resin and a mixed solvent consisting of at least one solvent for the resin selected from the group consisting of acetone, methylethyl ketone, methyl acetate, ethyl acetate, methanol, ethanol and nitro methane and at least one non-solvent for the resin selected from the group consisting of n-butanol, iso-propyl alcohol, toluol, xylol and n-butyl acetate, the mixing ratio of the solvent to the nonsolvent being within the range from 70:30 to 60:40.

2. The colored marker ink according to claim 1, wherein the colorant is at least one member selected from the group consisting of dyes and pigments.

3. The colored marker ink according to claim 1, wherein the resin is at least one member selected from the group consisting of nitrocellulose, cellulose acetate, ethyl cellulose, cellulose acetate butyrate, and vinyl chloride-vinyl acetate copolymers.

4. The colored marker ink according to claim 2, wherein the dye possesses affinity for the resin used in the ink.

5. The colored marker ink according to claim 1, wherein the resin is fast dyed with the colorant before being blended with the mixed solvent.

6. The colored marker ink according to claim 5, wherein the mixed solvent possesses poor solubility to the colorant used in the ink.

7. The colored marker ink according to claim 1, wherein the resin is kneaded with a pigment selected as the colorant before being blended with the mixed solvent.

8. The colored marker ink according to claim 1, wherein the solvent for the resin is hydrophilic.

9. The colored marker ink according to claim 1, wherein the non-solvent for the resin is hydrophobic.

10. The colored marker ink according to claim 1, wherein the ink solvent system contains a small amount of water.

11. The colored marker ink according to claim 1, wherein said at least one solvent and said at least one non-solvent are mixed and said colorant and said resin are dissolved in said solvent mixture.

* * * * *